(12) United States Patent
Haggerty et al.

(10) Patent No.: US 7,703,287 B2
(45) Date of Patent: Apr. 27, 2010

(54) DYNAMIC SEALING ASSEMBLY TO ACCOMMODATE DIFFERENTIAL THERMAL GROWTH OF FUEL INJECTOR COMPONENTS

(75) Inventors: Daniel Haggerty, Clive, IA (US); Troy Hall, Des Moines, IA (US)

(73) Assignee: Delavan Inc, West Des Moines, IA (US)

( * ) Notice: Subject to any disclaimer, the term of this patent is extended or adjusted under 35 U.S.C. 154(b) by 733 days.

(21) Appl. No.: 11/590,301

(22) Filed: Oct. 31, 2006

(65) Prior Publication Data

US 2008/0098737 A1    May 1, 2008

(51) Int. Cl.
*F02C 1/00* (2006.01)
*F02C 3/00* (2006.01)
(52) U.S. Cl. .............................. 60/740; 60/742; 60/748; 60/737; 60/734; 60/746
(58) Field of Classification Search .................... 60/704, 60/742, 748, 734, 737, 746, 740
See application file for complete search history.

(56) References Cited

U.S. PATENT DOCUMENTS

| | | | |
|---|---|---|---|
| 3,129,891 A | 4/1964 | Vdoviak | |
| 4,186,877 A | 2/1980 | Wilcox et al. | |
| 4,258,544 A | 3/1981 | Gebhart et al. | |
| 4,649,950 A | 3/1987 | Bradley et al. | |
| 5,423,178 A | 6/1995 | Mains | |
| 6,276,141 B1 * | 8/2001 | Pelletier | 60/740 |
| 6,357,222 B1 | 3/2002 | Schilling et al. | |
| 6,755,024 B1 * | 6/2004 | Mao et al. | 60/776 |

* cited by examiner

*Primary Examiner*—Michael Cuff
*Assistant Examiner*—Craig Kim
(74) *Attorney, Agent, or Firm*—Scott D. Wofsy; Edwards Angell Palmer & Dodge LLP

(57) ABSTRACT

A fuel injector for a gas turbine engine is disclosed which includes an inlet fitting for receiving fuel, a nozzle for issuing fuel into the gas turbine engine, an injector body extending between the inlet fitting and the nozzle and having and interior bore extending therethrough, and an elongated fuel tube disposed within the interior bore of the injector body for delivering fuel from the inlet fitting to the nozzle. The fuel tube has an inlet end portion dynamically associated with the inlet fitting and an outlet end portion rigidly connected to the nozzle. An adapter is operatively associated with either the inlet end section of the fuel tube or a reception bore formed with the inlet fitting of the injector for accommodating a seal member in a manner that permits thermal growth of the injector body relative to the fuel tube.

32 Claims, 10 Drawing Sheets

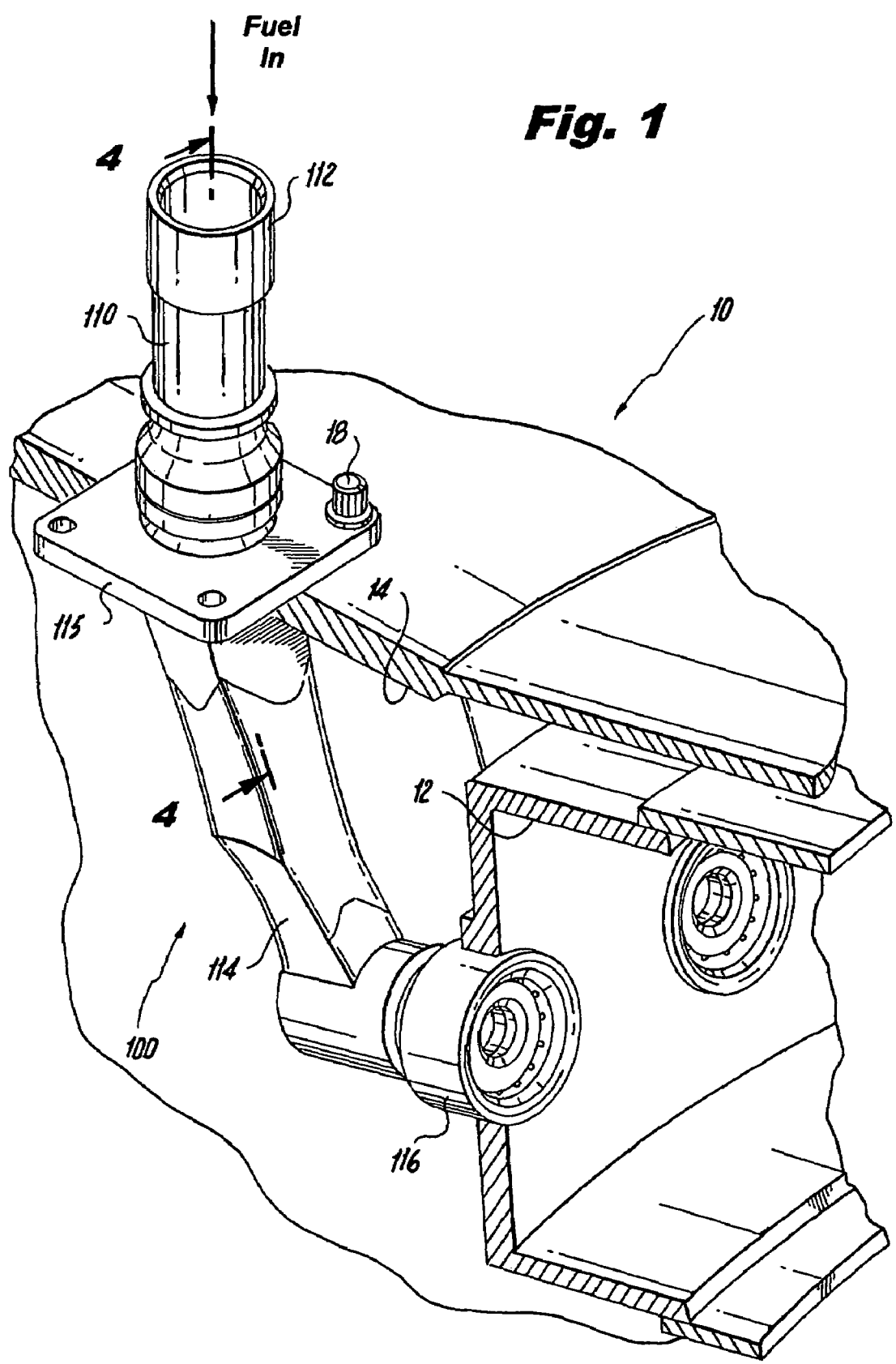

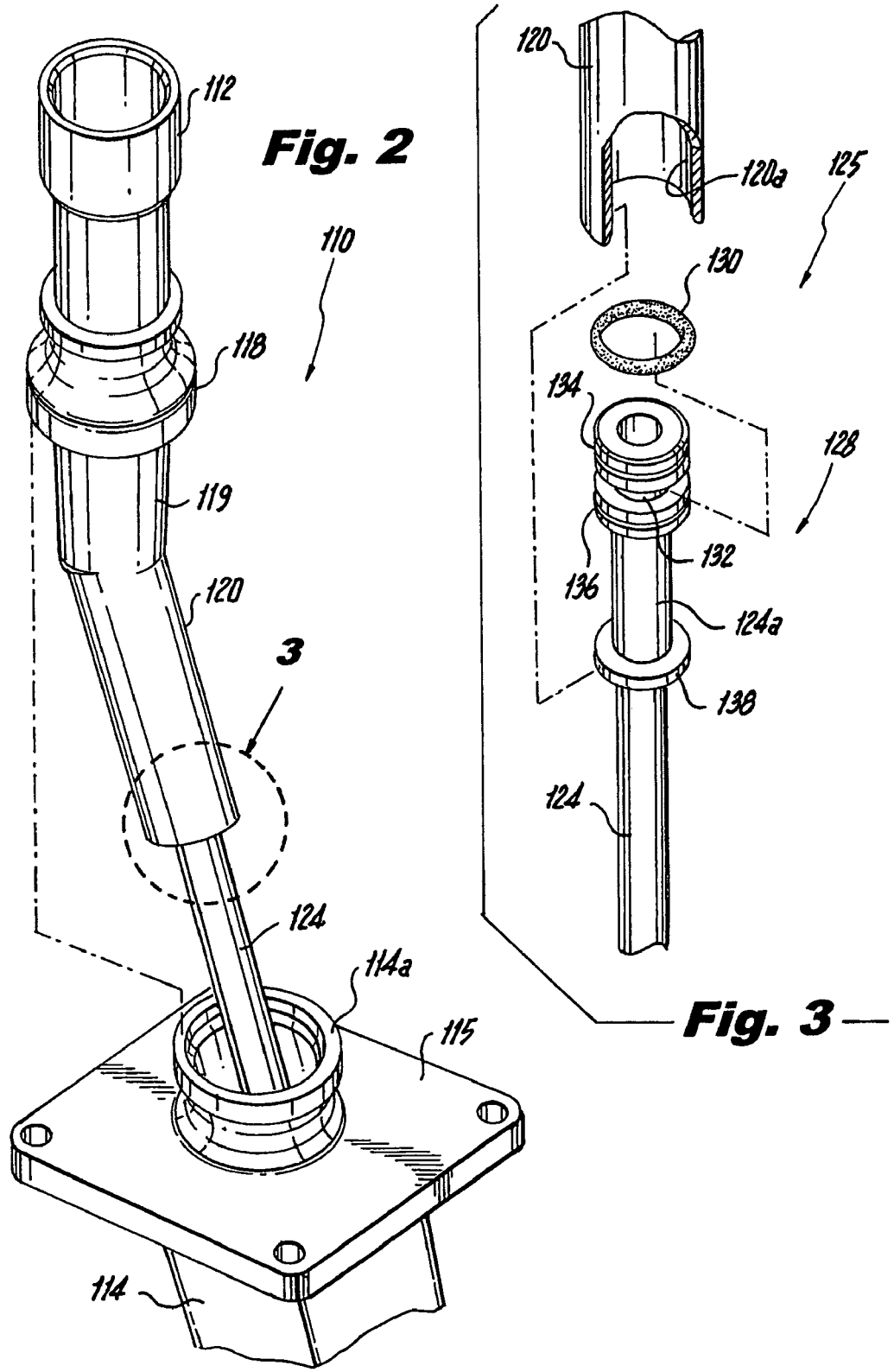

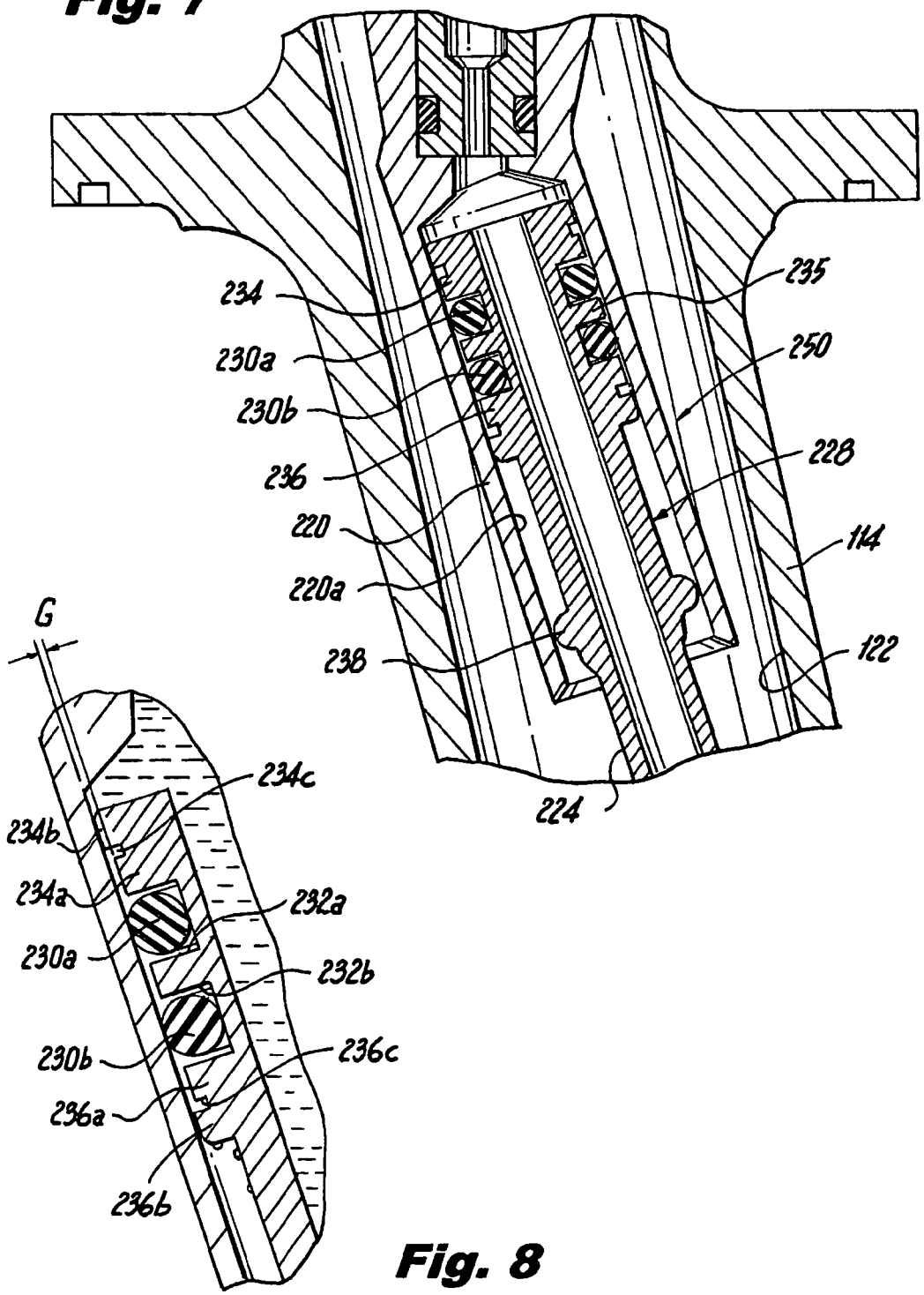

DYNAMIC SEALING ASSEMBLY TO ACCOMMODATE DIFFERENTIAL THERMAL GROWTH OF FUEL INJECTOR COMPONENTS

BACKGROUND OF THE INVENTION

1. Field of the Invention

The subject invention is directed to an apparatus to compensate for differential growth of fuel injector components due to thermal expansion, and more particularly, to an apparatus for accommodating thermal growth of a fuel injector body relative to a fuel delivery tube disposed within the fuel injector body during engine operation.

2. Description of Related Art

Fuel injectors are important components of gas turbine engines and they play a critical role in determining engine performance. A typical fuel injector includes an external support body having an inlet fitting at one end for receiving fuel and an atomizer nozzle at the other end for issuing atomized fuel into the combustor of a gas turbine engine. The inlet fitting is in fluid communication with the atomizer nozzle by way of an internal fuel delivery tube.

During engine operation, the external support body of the fuel injector is surrounded by high-temperature compressor air, while the internal fuel delivery tube carries liquid fuel to the atomizer nozzle at a much lower temperature than the compressor air. Because of the temperature difference, the injector support body experiences thermal expansion differently than the fuel delivery tube. More specifically, the injector support body will experience thermal growth to a greater extent than the fuel delivery tube.

In some fuel injectors, the fuel delivery tubes are rigidly connected to the injector support body at one end adjacent the inlet fitting and to the atomizer nozzle on the other end, using a welded or brazed joint. As a result of the differential thermal expansion between the injector support and the fuel delivery tube, high stress concentrations can develop at the joint locations. These stress concentrations can lead to the formation and propagation of cracks, eventually leading to fuel leaks, resulting in injector failures.

Efforts have been made to mitigate these problems. For example, for many years it was well known to design injectors with fuel tubes having helical or coiled sections to accommodate differential thermal growth between the injector support and the fuel tube. Indeed, the prior art is replete with patents disclosing such coiled fuel tubes, as shown for example in U.S. Pat. No. 3,129,891 to Vdoviak; U.S. Pat. No. 4,258,544 to Gebhart et al.; U.S. Pat. No. 4,649,950 to Bradley et al.; and U.S. Pat. No. 6,276,141 to Pelletier. Those skilled in the art will readily appreciate that there is a significant cost associated with the formation of a helically coiled fuel tube, particularly in instances wherein dual concentric fuel tubes are employed, as in the Pelletier patent.

The subject invention provides a cost-effective solution to mitigate the problems associated with differential thermal expansion of injector components, and an improvement over prior art devices employing helical fuel tubes. More particularly, the subject invention provides an apparatus to compensate for thermal growth of the injector support body relative to the fuel delivery tube during engine operation.

SUMMARY OF THE INVENTION

The subject invention is directed to a new and useful fuel injector for a gas turbine engine that overcomes many of the deficiencies of the prior art by providing a novel dynamic seal assembly for the fuel delivery tube of the injector. This novel fuel injector includes an inlet fitting portion for receiving fuel from a fuel source, an outlet nozzle portion for issuing fuel into the gas turbine engine, an injector support body extending between the inlet fitting portion and the outlet nozzle portion and having an interior bore or cavity extending therethrough, and an elongated fuel tube disposed within the interior bore of the injector body for delivering fuel from the inlet fitting to the nozzle.

The fuel delivery tube has an inlet section dynamically associated with the inlet fitting portion and an outlet section joined or otherwise rigidly connected to the outlet nozzle portion. The inlet section of the fuel delivery tube includes an adapter for retaining at least one dynamic sealing member, and the inlet fitting portion defines a reception bore or sleeve for accommodating the adapter in a manner that permits thermal growth of the injector body relative to the fuel tube. In one embodiment of the subject invention, the seal adapter is integrally formed with the fuel delivery tube. In another embodiment of the subject invention, the seal adapter is joined to the inlet end of the fuel delivery tube.

Preferably, the dynamic sealing member is an O-ring type seal and is retained in an annular seal retention channel formed between two axially spaced apart annular flanges associated with an upper end portion of the adapter. Each annular flange of the adapter includes a first annular flange portion adjacent the annular seal retention channel and a second annular flange portion axially spaced from the first annular flange portion. Preferably, an annular debris catching groove is defined between the first and second annular flange portions of each annular flange to protect the seal.

The first annular flange portion of each annular flange has a reduced diameter with respect to the second annular flange portion of each annular flange, so that an axially extending zone is formed adjacent the dynamic sealing member where there is no contact between the first annular flange portion of each annular flange and an interior surface of the reception bore. An annular rib is associated with a lower end portion of the adapter to form a heat barrier at a lower end portion of the reception bore to protect the dynamic sealing member. To ensure the integrity of the system, it is preferred that the dimensional ratio between the axial length extending from the mid-line of the annular sealing member to the mid-line of the annular rib and the inner diameter of the cylindrical reception bore is preferably not less than about 1.5.

In another embodiment of the subject invention, the reception bore of the inlet fitting defines the seal adapter for retaining at least one dynamic sealing member and the inlet section of the fuel delivery tube is dynamically accommodated therein. In this configuration, it is preferred that the dimensional ratio between the axial length extending from the mid-line of the annular sealing member to the mid-line of the annular heat barrier rib and the outer diameter of the inlet section of the fuel tube is preferably not less than about 1.5.

These and other features of the apparatus of the subject invention will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the fuel injectors and dynamic sealing assemblies of the subject invention without undue experimentation, preferred embodiments thereof will be described in detail hereinbelow with reference to certain figures, wherein:

FIG. 1 is a perspective view of the fuel injector of the subject invention, wherein the upper portion of the nozzle body is welded to the main injector body;

FIG. 2 is a perspective view of the upper end portion of the fuel injector of FIG. 1, broken along the weld line showing removal of the O-ring adapter to facilitate service or replacement of the dynamic O-ring seal shown in FIG. 3;

FIG. 3 is a perspective view of the of the O-ring seal adapter separated from reception bore of the heat shield sleeve associated with inlet end portion of the fuel injector;

FIG. 7 is an enlarged side elevational view of the upper end portion of the fuel injector support body of FIG. 1 in cross-section, showing another embodiment of the O-ring adapter of the subject invention, which employs two axially spaced apart O-ring seals;

FIG. 8 is an enlarged elevational view in cross-section of a portion of the O-ring adapter of FIG. 7, showing the debris collection grooves and no contact zone of the O-ring adapter;

DETAILED DESCRIPTION OF PREFERRED EMBODIMENTS

Figure 4:
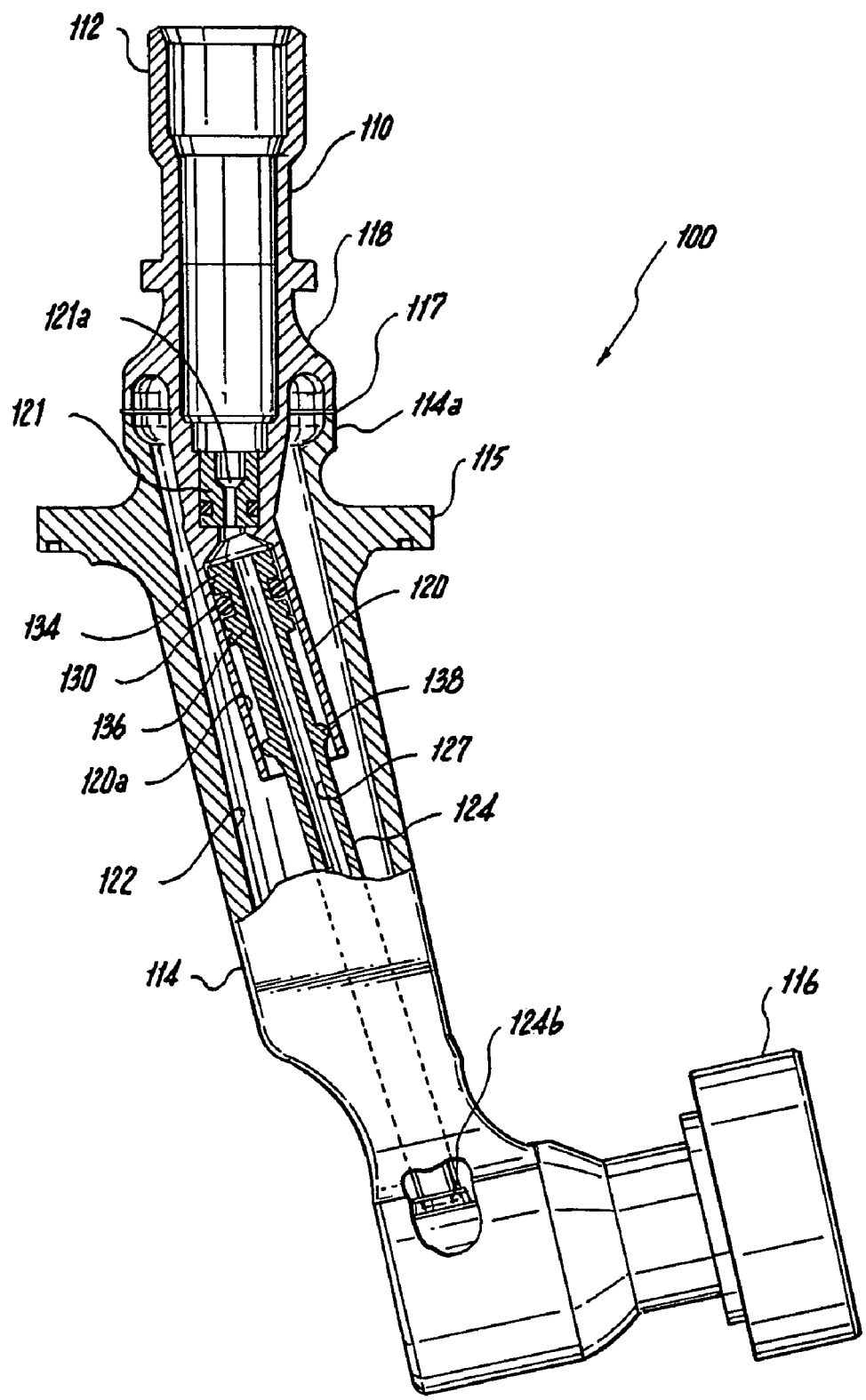
FIG. 4 is a side elevational view in partial cross-section of the fuel injector of FIG. 1, illustrating the dynamic seal assembly of the subject invention, which accommodates thermal displacement of the O-ring adapter of the fuel tube within the reception bore of the heat shield sleeve.

Referring now to the drawings wherein like reference numerals identify similar features or elements of the various embodiments of the dynamic sealing assemblies of the subject invention disclosed herein, there is illustrated in FIG. 1 a fuel injector constructed in accordance with a preferred embodiment of the subject invention and designated generally by reference numeral 100.

Fuel injector 100 is adapted and configured to issue atomized fuel into the combustion chamber 12 of a gas turbine engine 10. In general, fuel injector 100 includes an inlet end portion 110 including a fuel inlet fitting 112 for receiving fuel from a distribution manifold (not shown), an elongated body portion or support strut 114 extending from the inlet end portion 110, and a fuel atomization nozzle 116 for issuing fuel into the combustion chamber 12. A mounting flange 115 is provided at the upper end of the support strut 114 below the fuel inlet fitting 112 for securing the fuel injector 100 to the outer casing 14 of gas turbine engine 10 with threaded fasteners 18 or the like.

Those skilled in the art will readily appreciate that during engine operation, the support strut 114 of fuel injector 100 is surrounded by high-temperature compressor air flowing through the outer casing 14 and combustion chamber 12 of gas turbine 10. At the same time, the fuel delivery components within the support strut 114 carry fuel to the nozzle 116 at a much lower temperature than the compressor air. Consequently, the injector support strut 114 experiences thermal expansion differently than the fuel delivery components housed therein. More specifically, the injector support strut 114 will experience thermal growth to a greater extent than the fuel delivery components housed within the support strut 114.

Referring now to FIGS. 2 through 4, the inlet end portion 110 of fuel injector 100 includes the fuel inlet fitting 112 shown in FIG. 1, and a radially enlarged engagement flange 118 for rigidly joining the inlet end portion 110 to the upper flange 114a of support strut 114 along a weld joint 117, during assembly of the fuel injector 100 (see FIG. 4). Inlet end portion 110 further includes a downwardly projecting body section 119 for retaining a sealed insert 121 that defines a trim orifice 121a for regulating the amount of fuel flowing from the fuel inlet fitting 112 to the fuel nozzle 116, as best seen in FIG. 4. As best seen in FIG. 3, inlet end portion 110 also includes a cylindrical heat shield or sleeve 120 having an interior bore 120a. Heat shield sleeve 120 extends into the interior bore 122 of support strut 114, to accommodate a dynamic seal assembly 125, as shown in FIG. 4.

Referring to FIG. 3, the dynamic seal assembly 125 is operatively associated with the inlet section 124a of an elongated fuel delivery tube 124 that extends through the interior bore or cavity 122 of support strut 114. Fuel delivery tube 124 defines a central fuel passage 127. The outlet section 124b of fuel delivery tube 124 is brazed or otherwise joined to interior components of the fuel atomization nozzle 116, as best seen in FIG. 4. For example, the outlet section 124b of fuel delivery tube 124 can be joined to a fuel swirler component of the atomization nozzle 116. Because the outlet section 124b of fuel delivery tube 124 has a fixed, fluid-tight connection with fuel nozzle 116, thermal growth of support strut 114 will have a direct effect on the fuel delivery tube 124. That effect is exhibited by thermal displacement or slippage of the fuel delivery tube 124 relative to the inlet end portion 110 of injector 100 and is accommodated by the dynamic seal assembly 125 supported within the bore 120a of heat shield sleeve 120 of inlet end portion 110.

Referring to FIG. 3, the inlet section 124a of fuel delivery tube 124 defines an integrally formed adapter 128 for supporting an O-ring type seal 130 or a similar sealing member. The seal 130 may be formed from Viton™, Perflourocarbon, Kalrez™, CEC26222™ or a similar material. Preferably, seal 130 is retained in an annular seal retention channel 132 formed in the adapter 128 between two axially spaced apart annular flanges 134, 136 associated with an upper end portion of the adapter 128. The seal 130 can be installed in retention channel 132 with a lubricant to extend its service life. It is envisioned that the seal 130 can be lubricated, replaced or otherwise serviced by cutting the inlet end portion 110 from the upper end of the support body 114 along the weld joint 117 between flanges 118 and 114a. While not shown, it is also envisioned that the O-ring seal 130 can be cooled to increase its service life by flowing cooling fluid through or otherwise in close proximity to the seal retention channel 132.

Figure 5:
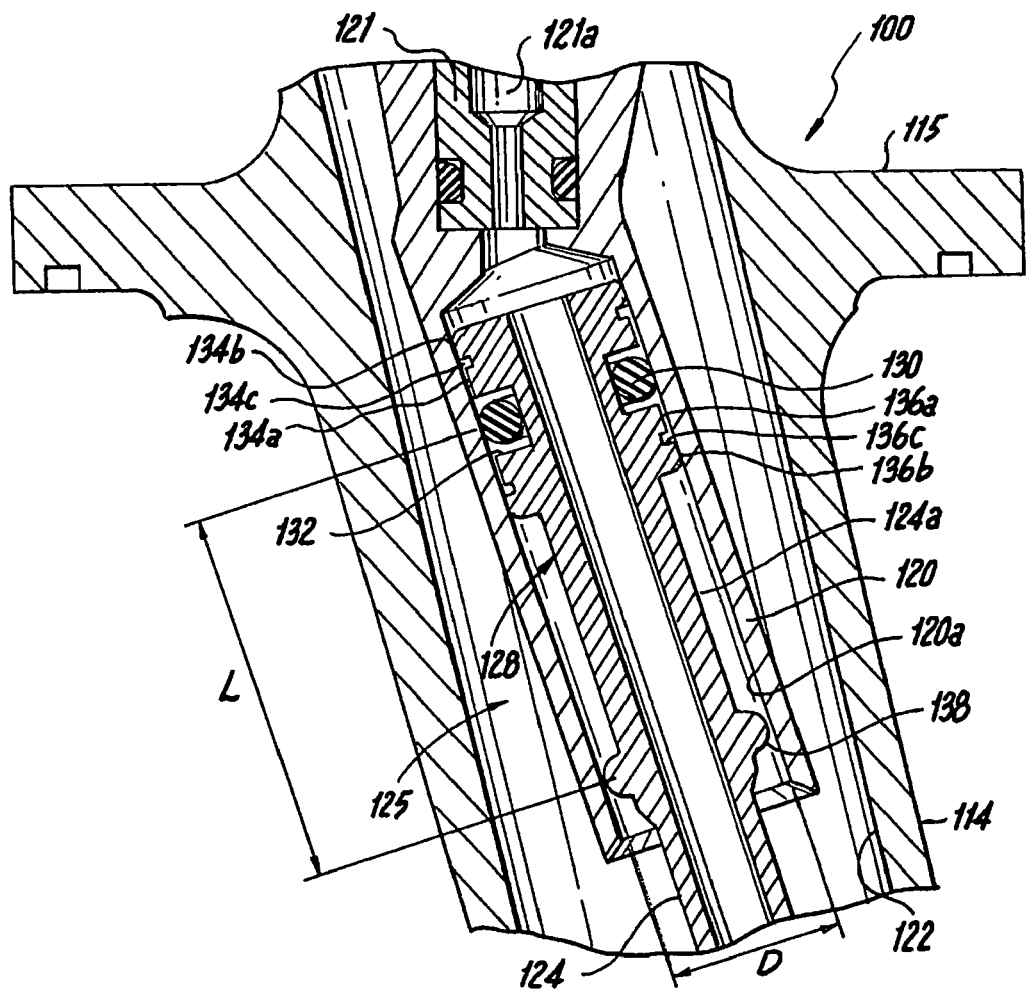
FIG. 5 is an enlarged side elevational view of the upper end portion of the fuel injector support body in cross-section, showing the O-ring adapter components in cross-section.

Referring to FIG. 5, each annular flange 134, 136 of the adapter 128 includes a first annular flange portion 134a, 136a adjacent the annular seal retention channel 132 and a second annular flange portion 134b, 136b axially spaced from the first annular flange portion 134a, 136a. Preferably, an annular debris catching groove 134c, 136c is defined between the first annular flange portions 134a, 136a and second annular flange portions 134b, 136b of each annular flange 134, 136 to protect the seal 130 from debris that can result from internal components interfering with one another (e.g., from metal-to-metal scratching or galling). In the absence of the debris catching grooves, particulate debris could abrade or otherwise damage the seal 130, compromising its ability to maintain a fluid tight seal.

Figure 6:
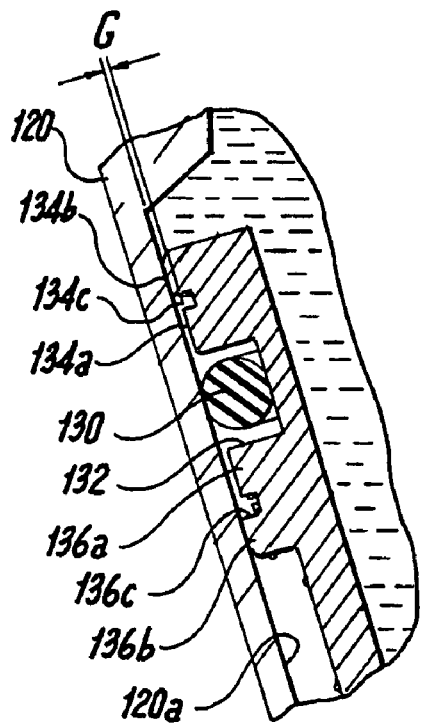
FIG. 6 is an enlarged elevational view in cross-section of a portion of the O-ring adapter of FIG. 5, showing the debris collection grooves and the no contact zone of the O-ring adapter.

As best seen in FIG. 6, the first annular flange portion 134a, 136a of each annular flange 134, 136 has a reduced diameter with respect to the second annular flange portion 134b, 136b of each annular flange 134, 136. This dimensional difference creates a gap G so that a zone is formed adjacent the dynamic sealing member 130 wherein there is no contact between the first annular flange portion 134a, 136a of each annular flange 134, 136 and an interior surface of the reception bore 120a of heat shield 120. In contrast, there is surface-to-surface bearing contact between the radially outer surfaces of the second annular flange portion 134b, 136b of each annular flange 134, 136 and the interior surface of reception bore 120a of heat shield sleeve 120. Preferably, the interior surface of the reception bore 120a and at least the radially outer surfaces of the flange portion 134b, 136b of adapter 128 have a controlled (32 μin.) surface finish to ensure that the metallic interface between the adapter flange surfaces 128 and the reception bore 120a is smooth. Most preferably, it is as smooth as is mechanically possible for such an application.

In an exemplary embodiment, the zone of no contact is created by providing the first annular flange portion 134a, 136a of each annular flange 134, 136 with a diameter that is approximately 0.003 inches less than the diameter of the second annular flange portions 134b, 136b. Those skilled in the art will readily appreciate that such dimensional relationships are merely exemplary and are not intended to limit the subject disclosure in any way. In any event, the zone of no contact should be greater than the extent of thermal displacement or travel experienced by the adapter 128 to ensure that the seal member does not come into contact with any scratches or other surface artifacts on the interior surface of the heat shield 120.

Referring to FIG. 5, a rounded annular rib 138 is associated with a lower end portion of the adapter 128 to form a heat barrier at a lower end portion of the reception bore 120a of heat shield 120 to protect the dynamic sealing member 130 from thermal damage caused by high temperature compressor air drawn into the interior bore 122 of support strut 114. The smooth radius or roundness of annular rib 138 it designed to prevent drag forces that can arise when the fuel delivery tube experiences slippage due to thermal growth of the support strut 114. In this regard, the outer surfaces of flange portions 134b, 136b which are farthest way from the O-ring seal 130 are also rounded in order to minimize drag, wear and galling, as shown in FIGS. 5 and 6.

With continuing reference to FIG. 5, to ensure the structural integrity of the dynamic seal assembly 125, the adapter 128 has a dimensionally controlled length. More particularly, it is preferred that the dimensional ratio between the axial length L extending from the mid-line of the annular sealing member 130 to the mid-line of the annular rib 138 and the inner diameter $D_i$ of the cylindrical reception bore 120a of heat shield sleeve 120 is not less than about 1.5. As a result, there is a reduced likelihood that the adapter flange portions 134b, 136b contacting the reception bore 120a will bind so as to scratch or gall the smooth interior surface of reception bore 120a, when the adapter 128 undergoes thermal displacement or slippage. This dimensional relationship essentially reduces the resistance or drag forces of the dynamic sealing system.

Figure 6A:
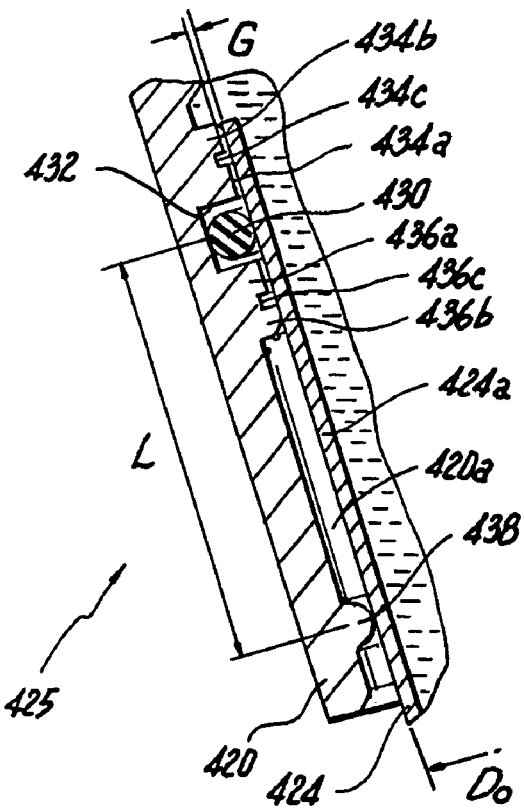
FIG. 6a is an enlarged elevational view in cross-section of an alternative embodiment of the dynamic seal assembly shown in FIGS. 5 and 6, wherein the annular flange surfaces and debris collection grooves are formed on the inner surface of the reception bore of the heat shield sleeve.

Referring now to FIG. 6a, there is illustrated another embodiment of the subject invention, wherein the inlet section 424a of the fuel delivery tube 424 has a constant outer diameter with a controlled (32 μin.) surface finish and the dynamic seal assembly 425 is associated with the interior surface of the reception bore 420a of heat shield 420. More particularly, the seal retention channels 432 that accommodates the annular sealing member 430 and the associated annular flanges 434a, 434b and 436a, 436b are formed with the interior surface of reception bore 420a, along with the debris catching grooves 434c, 436c and the rounded heat barrier annular rib 438.

As shown in FIG. 6a, there is a clearance gap G in the dynamic seal assembly 425 that forms a zone adjacent the dynamic sealing member 430 where there is no metal-to-metal contact between the first annular flange portion 434a, 436a of each annular flange 434, 436 and the outer surface of the inlet end portion 424a of fuel tube 424. To ensure the structural integrity of the dynamic seal assembly 425, it is preferred that the dimensional ratio between the axial length L extending from the mid-line of the annular sealing member 430 to the mid-line of the annular heat barrier rib 438 and the outer diameter $D_o$ of the cylindrical inlet section of the fuel tube 424 is not less than about 1.5.

Referring now to FIGS. 7 and 8, there is illustrated another embodiment of the dynamic sealing assembly of the subject invention, designated generally by reference numeral 250. Dynamic sealing assembly 250 includes an adapter 228 formed integrally with the inlet section of fuel delivery tube 224 for supporting two O-ring type seals 230a, 230b or similar sealing members in two axially spaced apart annular seal retention channels 232a, 232b. Upper seal retention channel 232a is formed between upper annular flange 234 and intermediate flange portion 235. Lower seal retention channel 232b is formed between lower annular flange 236 and intermediate flange portion 235.

As best seen in FIG. 8, the upper annular flange 234 of adapter 228 includes a first annular flange portion 234a adjacent the upper annular seal retention channel 232a and a second annular flange portion 234b axially spaced from the first annular flange portion 234a. The lower annular flange 236 of adapter 228 includes a first annular flange portion 236a adjacent the lower annular seal retention channel 232b and a second annular flange portion 236b axially spaced from the first annular flange portion 236a.

Preferably, an annular debris catching groove 234c, 236c is defined between the first annular flange portions 234a, 236a and second annular flange portions 234b, 236b of each annular flange 234, 236 to protect the seals 230a, 230b. As best seen in FIG. 8, the first annular flange portion 234a, 236a of each annular flange 234, 236 and the intermediate flange portion 235 have a reduced diameter with respect to the second annular flange portion 234b, 236b of each annular flange 234, 236 to create a clearance gap G. The clearance gap forms a zone adjacent the dynamic sealing members 230a, 230b where there is no contact between the annular flange portions 234a, 236a and 235 and an interior surface of the reception bore 220a of heat shield 220. As shown in FIG. 7, a rounded annular rib 238 is associated with a lower end portion of the adapter 228 to form a heat barrier at a lower end portion of the reception bore 220a of heat shield sleeve 220 to protect the dynamic sealing members 230a, 230b from thermal damage. It should be understood that the axial length of the heat shield sleeve 220 (as compared to sleeve 120) should be sized to accommodate the longer O-ring adapter 228.

Figure 9:
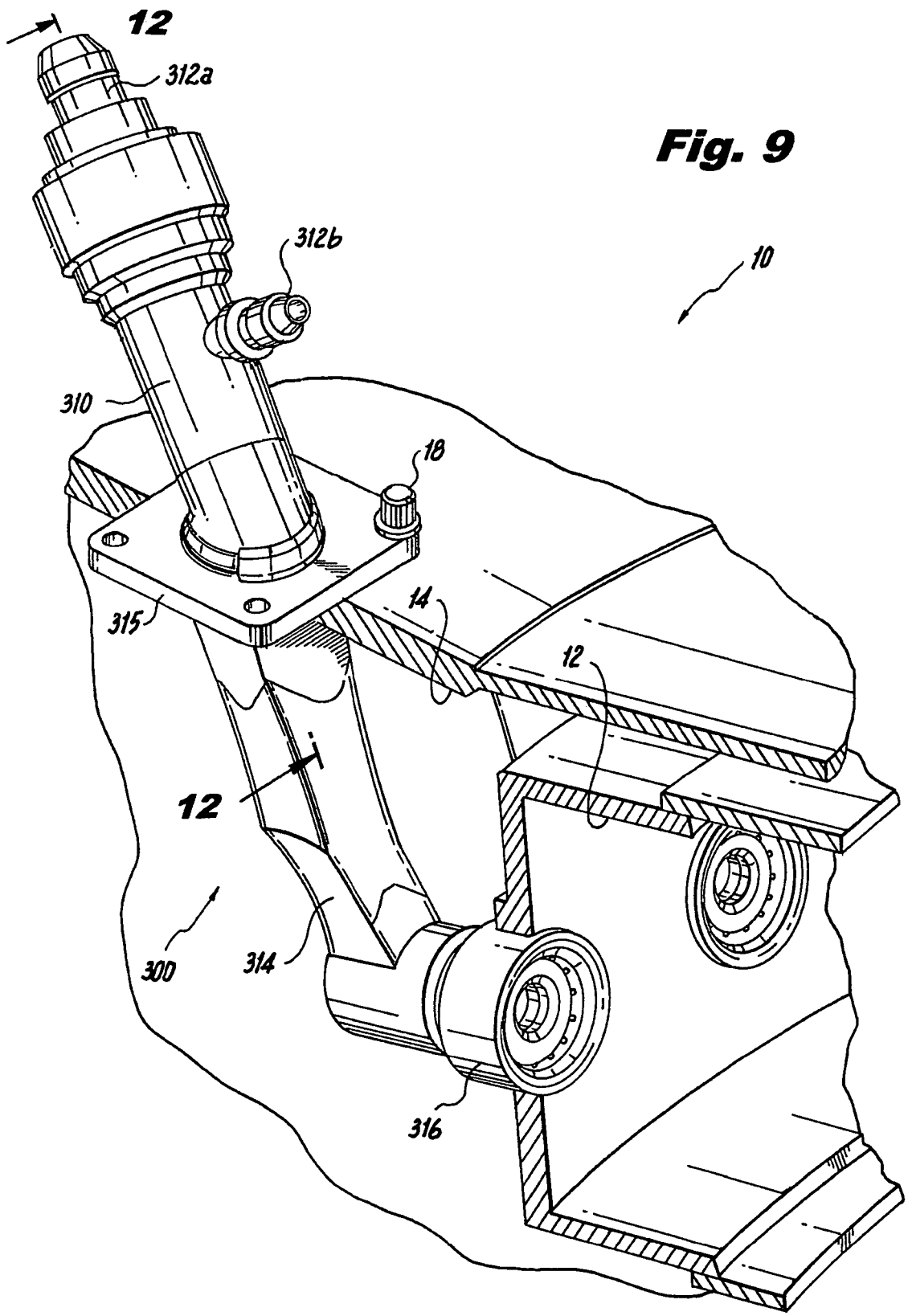
FIG. 9 is a perspective view of another fuel injector constructed in accordance with a preferred embodiment of the subject invention, which is configured as a dual fuel injector for issuing liquid or gaseous fuel into a gas turbine engine.

Referring now to FIG. 9, there is illustrated yet another fuel injector constructed in accordance with a preferred embodiment of the subject invention and designated generally by reference numeral 300. Fuel injector 300 is a dual fuel injector adapted and configured to issue either liquid fuel or gaseous fuel into the combustion chamber 12 of a gas turbine engine 10. In general, fuel injector 300 includes an inlet end portion 310 including a first fuel inlet fitting 312a for receiving liquid fuel from a liquid fuel distribution manifold (not shown) and a second fuel inlet fitting 312b for receiving gaseous fuel from a gaseous fuel distribution manifold (not shown). The liquid fuel is delivered to the outlet end of the injector 300 through a fuel delivery tube 324 within the interior bore 322 of support strut 314 (see FIG. 12), whereas the gaseous fuel is delivered to the outlet end of the injector 300 through the interior bore 322 of support strut 314. Typically, a dual fuel injector is employed with an industrial gas turbine engine used for power generation. The type of fuel used with the injector (i.e., liquid or gaseous) depends upon economics and availability.

Fuel injector 300 has an elongated body portion or support strut 314 extending from the inlet end portion 310, and a dual fuel nozzle 316 for issuing liquid or gaseous fuel into the combustion chamber 12. A mounting flange 315 is provided at the upper end of the support strut 314 below the inlet fittings 312b for securing the fuel injector 300 to the outer casing 14 of gas turbine engine 10 by threaded fasteners 18 or the like.

Figure 10:
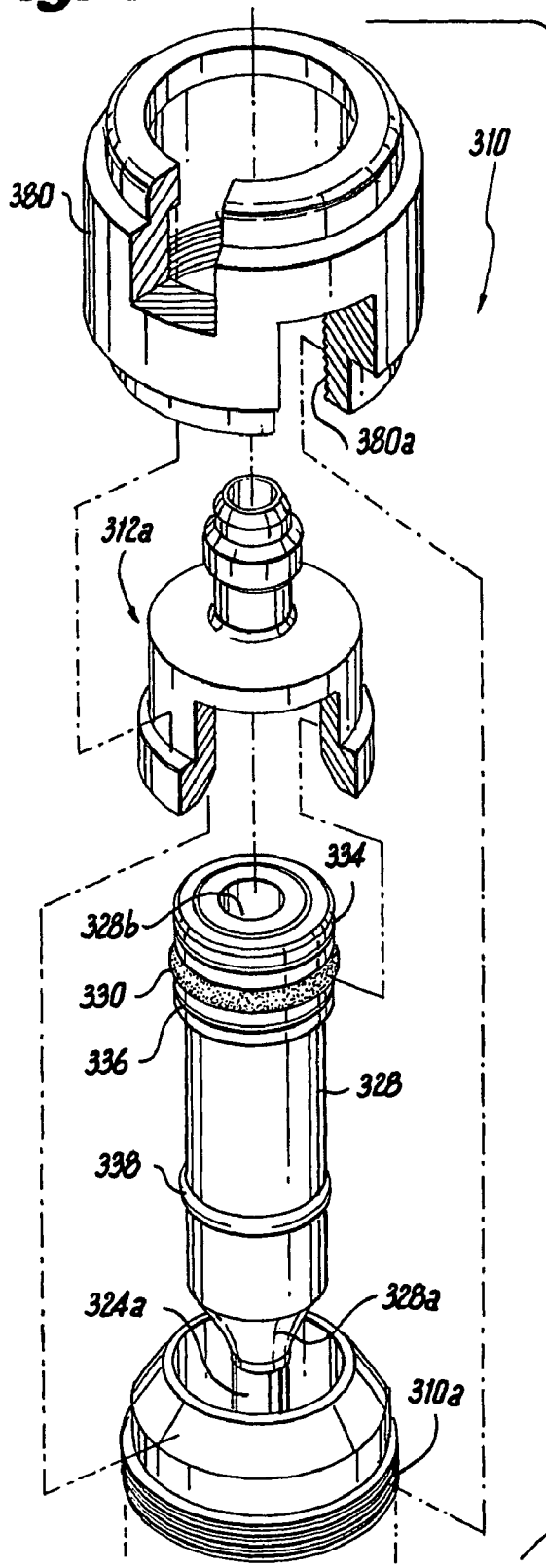
FIG. 10 is a perspective view of the inlet end portion of the dual fuel injector of FIG. 9, with the inlet end portion components disconnected or otherwise removed to provide ready access to the O-ring adapter joined to the inlet end of the fuel delivery tube.
Figure 11:
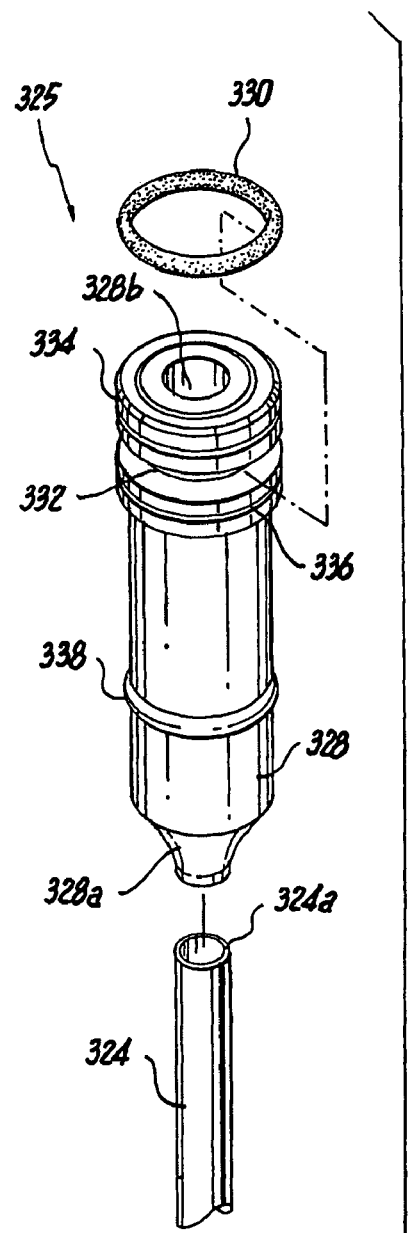
FIG. 11 is a perspective view of the O-ring adapter separated from the end of the fuel delivery tube.

Referring to FIGS. 10 and 11, the inlet end portion 310 of fuel injector 300 includes a removable locking nut 380 having an internally threaded bore 380a that is adapted and configured to mate with an externally threaded section 310a of inlet end portion 310. The threaded locking nut 380 facilitates the ready access to the O-ring adapter 330 housed within the inlet end portion 310 of fuel injector 300. Thus, the O-ring or sealing member 330 can be easily lubricated to increase its service life or replaced if it becomes worn without having to cut open the inlet end portion 310, as is the case with fuel injector 100. Those skilled in the art will readily appreciate that the dynamic sealing assembly 325 is located external to the casing of turbine engine 10 and thus the O-ring or sealing member 330 does not experience the same high temperature operating environment as the dynamic sealing assembly of the previously described embodiments of the invention.

It is envisioned that a fuel injector having a single fuel circuit, such as the fuel injector shown in FIG. 1, could be configured with an external dynamic sealing assembly (i.e., external to the engine casing) and a removable inlet fitting as shown in FIG. 10, to provide ready access to the dynamic sealing assembly. This type of modification is well within the scope of the subject disclosure.

The adapter 328 of dynamic sealing assembly 325 has a fuel passage 328b that communicates with the fuel delivery tube 324 and a neck portion 328a, which is brazed or otherwise joined to the inlet end 324a of fuel delivery tube 324. The outlet section 324b of fuel delivery tube 324 is brazed or otherwise joined to interior components of the fuel atomization nozzle 316, as best seen in FIG. 12.

Figure 12:
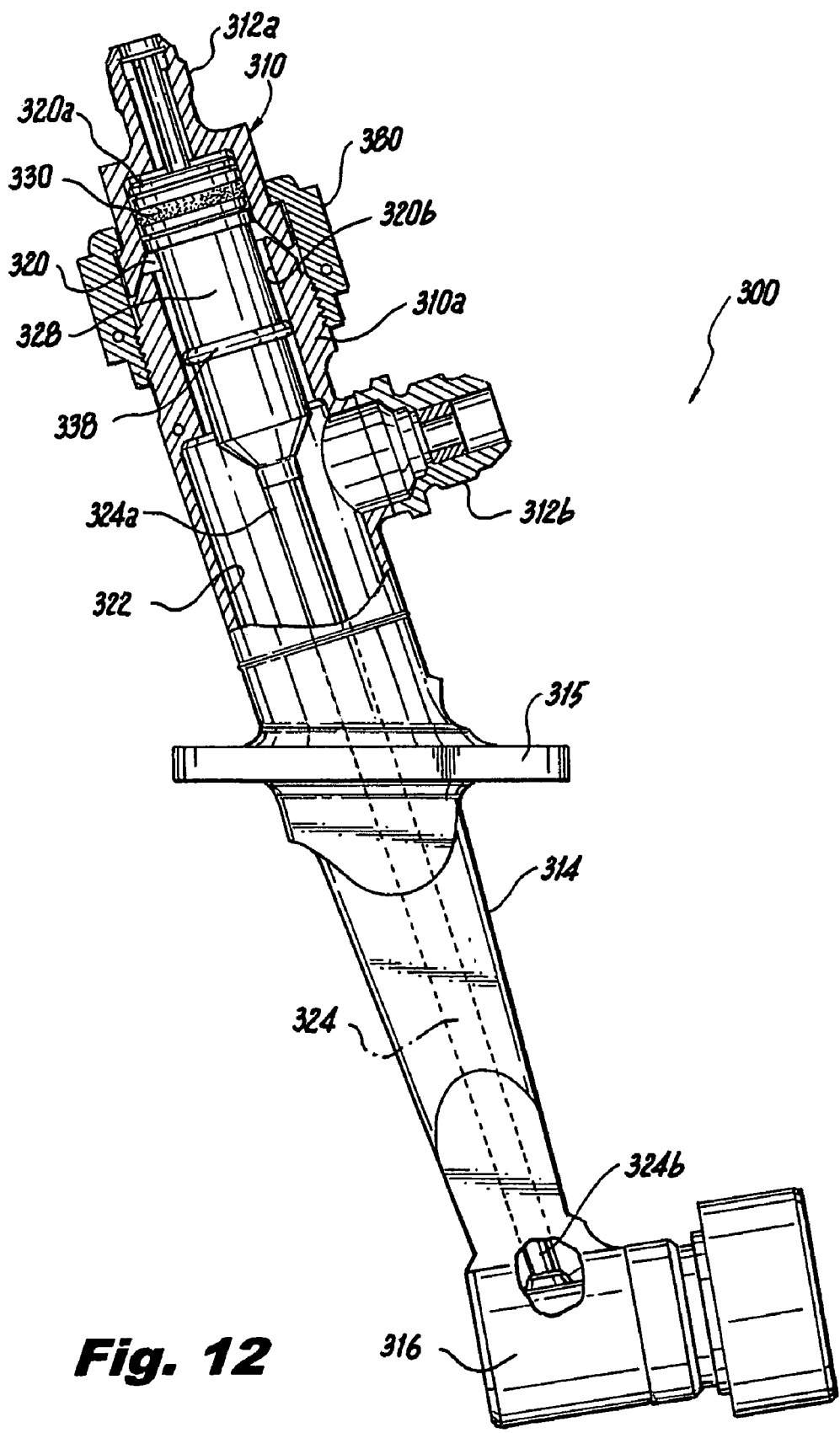
FIG. 12 is side elevational view in partial cross-section of the dual fuel injector of FIG. 9, illustrating the dynamic seal assembly of the subject invention, wherein the O-ring adapter is joined to the end of the fuel tube and accommodate within the reception bore of the inlet end portion of the fuel injector.

Referring to FIG. 12 in conjunction with FIG. 11, adapter 328 is accommodated within a reception bore 320 defined in part by the interior bore 320a of inlet fitting 312a and in part by the interior bore 320b of inlet end portion 310. On adapter 328, seal 330 is retained in an annular seal retention channel 332 formed between two axially spaced apart annular flanges 334, 336 associated with an upper end portion of the adapter 328.

Each annular flange 334, 336 of the adapter 328 includes a first annular flange portion 334a, 336a adjacent the annular seal retention channel 332 and a second annular flange portion 334b, 336b axially spaced from the first annular flange portion 334a, 336a. Preferably, an annular debris catching groove 334c, 336c is defined in each annular flange 334, 336.

Figure 14:
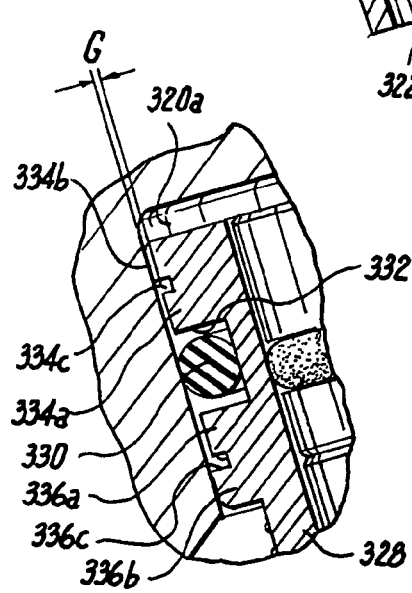
FIG. 14 is an enlarged elevational view in cross-section of a portion of the O-ring adapter of FIG. 10, showing the debris collection grooves and the no contact zone of the O-ring adapter.

As best seen in FIG. 14, the first annular flange portion 334a, 336a of each annular flange 334, 336 has a reduced diameter with respect to the second annular flange portion 334b, 336b of each annular flange 334, 336 so that a clearance gap G is formed adjacent the dynamic sealing member 330. The gap creates a zone where there is no contact between the first annular flange portion 334a, 336a of each annular flange 334, 336 and an interior surface of the reception bore 320a of inlet fitting 312a. In contrast, there is surface-to-surface bearing contact between the second annular flange portions 334b, 336b of each annular flange 334, 336 and the interior surface of reception bore 320a of inlet fitting 312a. As in the previous embodiments of the dynamic sealing assembly, a rounded annular rib 338 is formed near the lower end portion of the adapter 328 to form a heat barrier at a lower end portion of the reception bore 320b of inlet end portion 310 to protect the dynamic sealing members 330 from thermal damage caused by high temperature air.

To prevent binding, the adapter 328 has a dimensionally controlled length, whereby the dimensional ratio between the axial length L extending from the mid-line of the annular sealing member 330 to the mid-line of the annular rib 338 and the inner diameter $D_i$ of the cylindrical reception bore 320 (320a, 320b) is preferably not less than about 1.5.

Figure 13:
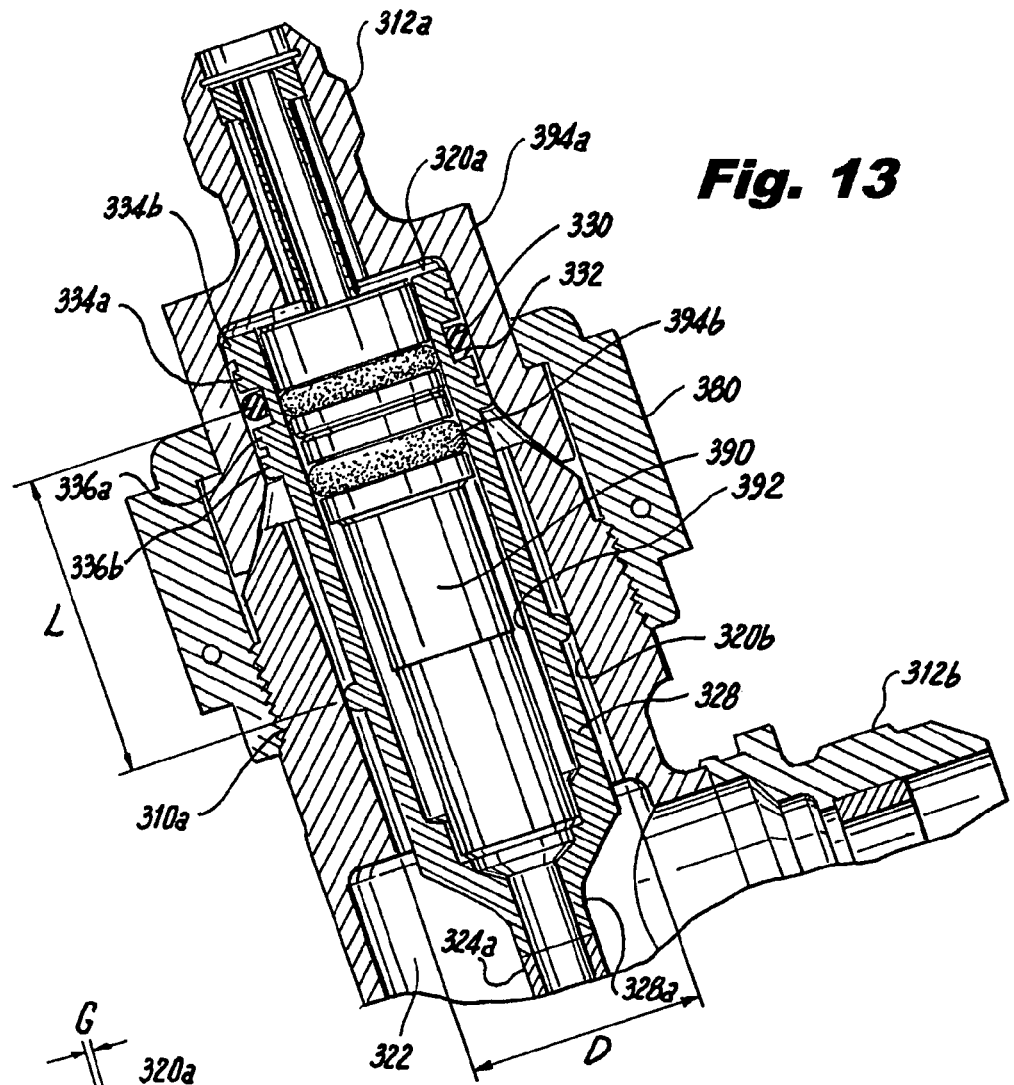
FIG. 13 is an enlarged side elevational view of the inlet end portion of the fuel injector of FIG. 9, in cross-section, showing the O-ring adapter components accommodated within the reception bore of the inlet end portion.

As best seen in FIG. 13, there is a sealed metering valve assembly 390 accommodated in the interior bore 392 of O-ring adapter 328. In general, the metering valve assembly includes O-ring seals 394a, 394b and is adapted and configured to control the flow of fuel from inlet fitting 312a to the fuel delivery tube 324.

It is envisioned that dynamic sealing assembly of the subject invention can be used in a variety of fuel injector configurations other than those expressly described herein. For example, the assembly can be employed as a dynamic seal between two or more concentric fuel circuits (e.g., in a fuel injector having a main fuel circuit and one or more pilot fuel circuits), a fuel circuit and an air filled cavity, a fuel circuit and a gas filled cavity (e.g., an argon filled cavity) or a fuel circuit and an evacuated cavity.

While the apparatus and structures of the subject invention have been shown and described with reference to preferred embodiments, those skilled in the art will readily appreciate that changes and/or modifications may be made thereto without departing from the spirit and scope of the subject invention as defined by the appended claims.

What is claimed is:

1. A fuel injector for a gas turbine engine comprising:
   a) an inlet end portion for receiving fuel;
   b) an outlet end portion for issuing fuel into the gas turbine engine;
   c) an injector support body extending between the inlet end portion and the outlet end portion and having an interior bore extending therethrough;
   d) an elongated fuel tube disposed within the interior bore of the injector body and having an inlet section operatively associated with the inlet end portion of the fuel injector and an outlet section operatively associated with the outlet end portion of the fuel injector, wherein adapter means are associated with one of the inlet section of the fuel tube and a reception bore means of the inlet end portion of the fuel injector for retaining at least one sealing member; and
   e) an annular seal retention channel formed in the adapter means between two axially spaced apart annular flanges, each annular flange having a first annular flange portion adjacent the annular seal retention channel and a second annular flange portion axially spaced from the first annular flange portion through an annular groove; wherein an annular groove is defined between the first and second annular flange portions of each annular flange.

2. A fuel injector as recited in claim 1, wherein the adapter means is formed with an outer surface of the inlet section of the fuel tube.

3. A fuel injector as recited in claim 1, wherein the adapter means is formed with an inner surface of the reception bore means of the inlet end portion of the fuel injector.

4. A fuel injector as recited in claim 1, wherein an annular sealing member is retained in an annular seal retention channel formed in the adapter means.

5. A fuel injector as recited in claim 1, wherein the first annular flange portion of each annular flange has a reduced diameter with respect to the second annular flange portion of each annular flange.

6. A fuel injector as recited in claim 4, wherein an annular rib is associated with a lower end portion of the adapter means.

7. A fuel injector as recited in claim 6, wherein a dimensional ratio between the axial length extending from a mid-line of the annular sealing member to a mid-line of the annular rib and an inner diameter of the reception bore means is not less than about 1.5.

8. A fuel injector as recited in claim 6, wherein a dimensional ratio between the axial length extending from a mid-line of the annular sealing member to a mid-line of the annular rib and an outer diameter of the inlet section of the fuel tube is not less than about 1.5.

9. A fuel injector as recited in claim 1, wherein the injector body includes a mounting flange for mounting the fuel injector to the gas turbine engine.

10. A fuel injector as recited in claim 1, wherein the inlet fitting is removably connected to the injector body.

11. A fuel injector as recited in claim 1, wherein the inlet fitting is joined to the injector body.

12. A fuel injector for a gas turbine engine comprising:
   a) an inlet fitting portion for receiving fuel;
   b) a nozzle portion for issuing fuel into the gas turbine engine;
   c) an injector support body extending between the inlet fitting and the nozzle portion and having an interior bore extending therethrough;
   d) an elongated fuel tube within the interior bore of the injector support body for delivering fuel from the inlet fitting portion to the nozzle portion, the fuel tube having an inlet section dynamically associated with the inlet fitting portion of the fuel injector and an outlet section joined to the nozzle portion of the fuel injector;
   e) a seal adapter integrally formed with the inlet section of the fuel tube; the seal adapter having an annular seal retention channel for accommodating a seal;
   f) a heat shield sleeve formed with the inlet fitting portion of the fuel injector and having a reception bore for dynamically accommodating the seal adapter;
   g) an annular rib protruding radially outward from a lower end portion of the seal adapter and axially spaced from the seal retention channel to form a heat barrier at the lower end portion of the reception bore of the heat shields that protects a seal associated with the seal adaptor from thermal damage; wherein the annular rib does not make contact with the seal accommodated in a seal retention channel.

13. A fuel injector as recited in claim 12, wherein a seal is retained in the annular seal retention channel formed in the seal adapter.

14. A fuel injector as recited in claim 13, wherein the annular seal retention channel is formed between two axially spaced apart annular flanges.

15. A fuel injector as recited in claim 14, wherein each annular flange includes a first annular flange portion adjacent the annular seal retention channel and a second annular flange portion axially spaced from the first annular flange portion.

16. A fuel injector as recited in claim 15, further comprising a groove defined between the first and second annular flange portions of each annular flange.

17. A fuel injector as recited in claim 15, wherein the first annular flange portion of each annular flange has a reduced diameter with respect to the second annular flange portion of each annular flange.

18. A fuel injector as recited in claim 13, wherein the annular rib is rounded.

19. A fuel injector as recited in claim 12, wherein a ratio between the axial length from a mid-line of the seal to a mid-line of the annular rib and an inner diameter of the reception bore is not less than about 1.5.

20. A fuel injector as recited in claim 12, wherein the seal adapter is configured to retain two axially spaced apart seals.

21. A fuel injector for a gas turbine engine comprising:
   a) an inlet fitting portion for receiving fuel;
   b) a nozzle portion for issuing fuel into the gas turbine engine;
   c) an injector support body extending between the inlet fitting and the nozzle portion and having an interior bore extending therethrough;
   d) an elongated fuel tube within the interior bore of the injector support body for delivering fuel from the inlet fitting portion to the nozzle portion, the fuel tube having an inlet section dynamically associated with the inlet fitting portion of the fuel injector and an outlet section joined to the nozzle portion of the fuel injector;
   e) a seal adapter joined to the inlet section of the fuel tube, the seal adapter having an annular seal retention channel for accommodating a seal;
   f) a reception bore formed by the inlet fitting portion of the fuel injector for dynamically accommodating the seal adapter;
   g) an annular rib protruding radially outward from a lower end portion of the seal adapter and axially spaced from the seal retention channel to form a heat barrier at the lower end portion of the reception bore of the heat shields that protects a seal associated with the seal adaptor from thermal damage; wherein the annular rib does not make contact with the seal accommodated in a seal retention channel.

22. A fuel injector as recited in claim 21, wherein a seal is retained in the annular seal retention channel formed in the seal adapter.

23. A fuel injector as recited in claim 22, wherein the annular seal retention channel is formed between two axially spaced apart annular flanges.

24. A fuel injector as recited in claim 23, wherein each annular flange includes a first annular flange portion adjacent the annular seal retention channel and a second annular flange portion axially spaced from the first annular flange portion.

25. A fuel injector as recited in claim 24, further comprising a groove defined between the first and second annular flange portions of each annular flange.

26. A fuel injector as recited in claim 24, wherein the first annular flange portion of each annular flange has a reduced diameter with respect to the second annular flange portion of each annular flange.

27. A fuel injector as recited in claim 22, wherein the annular rib is rounded.

28. A fuel injector as recited in claim 21, wherein a ratio between the axial length from a mid-line of the seal to a mid-line of the annular rib and an inner diameter of the reception bore is not less than about 1.5.

29. A fuel injector as recited in claim 21, wherein the inlet fitting portion has a fuel inlet fitting that is removably connected to the inlet fitting portion.

30. A fuel injector as recited in claim 29, wherein the fuel inlet fitting is connected to the inlet fitting portion by a threaded nut.

31. A fuel injector as recited in claim 21, wherein the fuel injector is a dual fuel injector, which includes a first fuel inlet fitting for receiving a first type of fuel and a second fuel inlet fitting for receiving a second type of fuel.

32. A fuel injector as recited in claim 31, wherein the first fuel inlet fitting is in fluid communication with the fuel tube and the second fuel inlet fitting is in fluid communication with the interior bore of the injector support body.

* * * * *

UNITED STATES PATENT AND TRADEMARK OFFICE
CERTIFICATE OF CORRECTION

PATENT NO.       : 7,703,287 B2                          Page 1 of 1
APPLICATION NO.  : 11/590301
DATED            : April 27, 2010
INVENTOR(S)      : Daniel Haggerty and Troy Hall It is certified that error appears in the above-identified patent and that said Letters Patent is hereby corrected as shown below:

Claim 12 was misprinted and should read as follows:

Column 10, line 5, "shields" should read --shield--.

Claim 21 was misprinted and should read as follows:

Column 10, line 67-Column 11, line 1, "shields" should read --shield--.

Signed and Sealed this
Fourth Day of January, 2011

David J. Kappos
*Director of the United States Patent and Trademark Office*